United States Patent Office
2,844,729
Patented July 22, 1958

2,844,729

DEVICE FOR THE QUANTITATIVE DETERMINATION OF GASEOUS INFRARED-ABSORBING MATERIAL

Karl Heinz Winterling, Konigstein (Taunus), and Alexander Kowert, Kelsterbach, Germany, assignors to Hartmann & Braun Aktiengesellschaft, Frankfurt am Main, Germany, a corporation of Germany Application June 14, 1954, Serial No. 440,881

Claims priority, application Germany June 19, 1953

6 Claims. (Cl. 250—43.5)

This invention relates to a device for analyzing mixtures by means of infrared radiation. It is a well known fact that many gases and vapors will absorb infrared radiation. This fact may be utilized for quantitative determination of the content of such gas or vapor in a given mixture. A beam of infrared radiation is allowed to pass a trough containing the mixture to be tested. Due to absorption the beam is weakened. The weakening of the beam in the wavelength range which corresponds to the absorption band of the interesting component is determined by a receiver sensitive only to this wavelength range. This receiver preferably consists of a chamber (receiving chamber) filled with the interesting component (measuring gas) alone which latter is warmed more or less according to the degree of absorption of the resp. wavelength band in the trough and hence according to the percentage of the interesting component present in the trough. As an improvement there may be provided a second arrangement of this kind, the trough however being filled with a reference gas. In this case the warming which takes place in both the receiving chambers is compared the one with the other. The present invention concerns a device of this kind.

It is an object of the invention to provide a device of especially high accuracy and quick response.

Figure 1:
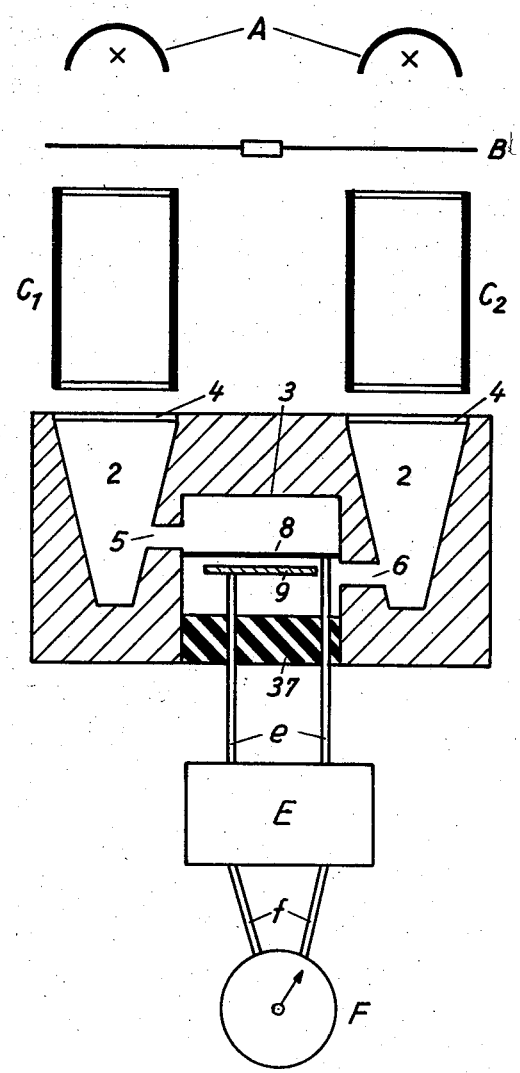

In the following the invention is described in detail with reference to the accompanying drawings of which Fig. 1 shows the basic design of a device according to the invention and Fig. 2, a vertical section of that part which contains the receiving chambers, Fig. 3, a horizontal section of this part and Fig. 4, a top view of this same part.

In Fig. 1 the letter A denotes two infrared radiators which have equal energy distribution and intensity and are arranged each in the focus of a parabolic reflector. The two radiation beams departing therefrom are periodically and simultaneously interrupted by a rotary sector disc B. The one of the beams then passes the trough $C_1$ containing the mixture to be tested, the other passes the trough $C_2$ containing a reference gas. Thereafter the beams traverse the windows 4 and enter the resp. receiving chambers 2. Both the receiving chambers are conically shaped recesses in a single metal block 1. By passages 5 and 6 the receiving chambers are communicated to a chamber 3 housing a membrane condenser 8, 9 which serves as an instrument transformer. Membrane 8 of the membrane condenser divides chamber 3 into two compartments. The upper one communicates by means of the passage 5 with the left hand receiving chamber, the lower one by means of the passage 6 with the right hand receiving chamber. As described above the gas in the receiving chambers, if irradiated by the resp. beams, is warmed in a different degree and hence a pressure difference is caused between both these chambers. These different pressures by means of the passages 5, 6 are brought to act upon the membrane 8 causing a warping of the same. If now both the beams are interrupted the gas temperatures of the two receiving chambers become equal again and membrane 8 again arrives at its zero position. This heat balance—and hence pressure balance—is accelerated by having both the receiving chambers located in a single metal block showing good heat conductivity. Moreover unsymmetric external temperature influences are thus allowed to balance quickly; errors, due to such influences, therefore, are reduced.

The membrane condenser is lying on direct voltage and therefore the periodical warping of its membrane 8 causes an alternating current which by means of two conductors $e$, leading through a cover plate 37 closing chamber 3, is led to an amplifier E and therefrom via the conductors $f$ to an indicating instrument F. The indication of this instrument is a measure of the percentage of the interesting component present in the mixture under test.

Figure 2:
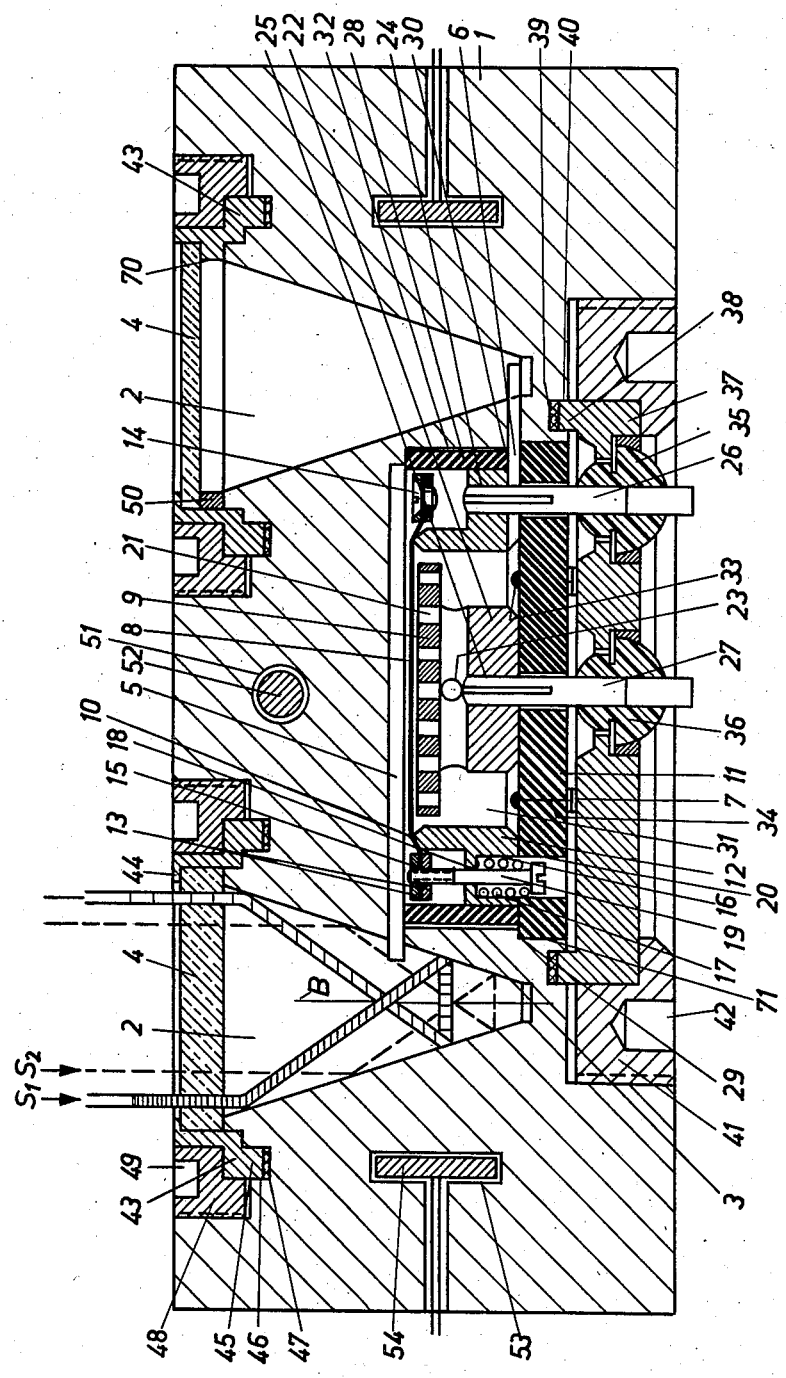

Fig. 2 is a vertical section of said metal block 1 and shows all parts of it in detail. The numeral 1 again denotes the metal block. Recessed into it from the upper side there are the two conical receiving chambers 2. Both the receiving chambers are located in a single metal block, because as mentioned above this means very good heat conductivity and hence the walls of the receiving chambers are bridged by a very small resistance to heat flow, resulting in a quick balance of heat. This is of special importance since the effect caused by the warming of the gas in the receiving chambers is very small and therefore disturbances by nonsymmetric thermic influences upon the receiving chambers may easily occur. Furthermore by having placed the receiving chambers in a single metal block the device is rendered less sensitive to shocks.

The same advantages are valid for the membrane condenser influenced by the pressure differences of the two receiving chambers, if according to the invention the membrane condenser and its communications are also placed in this same metal block. It is preferred to arrange the receiving chambers with their axes in parallel side by side in the upper part of the metal block and to provide a cylindrical chamber 3 between them which serves as a housing for the membrane condenser. Chamber 3 is recessed into the metal block from the lower side. Due to external accelerating forces the membrane 8 of the membrane condenser sometimes may be brought to vibrate and thus errors may be caused. These may essentially be lessened by laying the plane of the membrane 8 in the direction of the most frequent occurring acceleration-vectors. Since these vectors in many cases extend in a horizontal plane it is advantageous to arrange the membrane in this direction too. Therefore it normally stands perpendicular to the axes of the receiving chambers because for many reasons a vertical direction of the radiation beams is preferred. The upper and lower compartment of the condenser chamber which is divided by the membrane can be connected with the receiving chambers 2 in simple manner by slots 5, 6 of large area recessed into the metal block 1. The one of the receiving chambers being connected with the lower compartment of the condenser chamber and the other with the upper one. These slots 5, 6 have an essentially less resistance to gas flow as compared with drill holes, which results in a smaller response time constant.

The diameter of the conical receiving chambers 2 decreases with increasing depth—seen in the direction of travel of the radiation. Chambers 2 have bright and shiny inner surfaces which will reflect much of the radiation striking the same. The upper openings of chambers 2 are vacuum-tight shut by window plates 4 being of material transparent to infrared radiation as for instance mica, sodium chloride or sapphire. Each of these plates is cemented into a loose ringshaped holder 43 which may possess an upper border 44 radially protruding towards the centre and against which the window-plates 4 bear. At the other end each of these holders has a cylindrical border 45 protruding into a ringshaped groove 46 recessed into the metal block 1 and extending concentrically around the resp. receiving chamber. On the bottom of this groove 46 there is provided a tightening strip 47. Each of these holders carrying an infrared transparent window-plate can be connected vacuum-tight to metal block 1 by means of a clamping ring 48 threaded on its convex surface and provided with drill holes 49 for the insertion of a tool. The clamping ring 48 is put on the holder 43 from above. Thus the holders with its window-plates cemented in are easily changeable.

The thickness of mica plates used as chamber windows lies below 0.1 mm., sapphire windows usually having a thickness of 1 mm. and sodium-chloride windows of 4 mm. and more. These windows according to circumstances may be used in the same device. When using a thick window-plate (e. g. sodium-chlorid) then the space provided by the holder 43 will be filled out by the window-plate cemented into it nearly completely as shown at the left hand chamber in Fig. 2. If the window-plate is thinner consisting for instance of mica or sapphire then the inner surface of the holder, which is left free, is made shiny or filled out by a metal ring 50 being cemented into the holder and having a mirror-like inner surface as shown at the right hand receiving chamber lefthand and righthand of its axis in Fig. 2. The inner, silvered border 70 may be shaped so as to form a rest for the thin window-plate. The outer border 44 may then be omitted. In this case the window-plate 4 is set into the holder 43 from above and cemented with it. In any case, however, the position of the outer surface of the window-plate in respect to the holder is determined so, that the air gaps between the windows of the receiving chambers and those of the troughs provided above them and filled with the mixture to be examined resp. the reference gas are of equal width; this width being as small as possible. By silvering the border 70 of the holder 43 as well as by cementing into the holder a mirror-like reflecting metal ring 50 the rays hitting these reflecting surfaces are deflected towards the inner of the receiving chambers and hence utilized for the absorption. If the windows are formed as described above it is possible to use them also for other parts of the device e. g. for radiator-windows or trough-windows.

The conical shape of receiving chambers 2 means lesser need of space for them. Thus the membrane condenser can be placed directly between them. Furthermore the conical shape allows the volume of the receiving chambers to be lessened to approximately 1/3 as compared with the volume of cylindrical receiving chambers. The effective increase in temperature and hence in pressure is inversely proportional to the volume of the receiving chamber presumed the incoming radiation being constant. Therefore an essential increase of sensitivity is obtained. In addition the way of the radiation is lengthened as compared with the real depth of the receiving chamber by multiple reflection on the specular reflecting conical walls. Thus the radiation is better used in the described device (equal depth of the chambers presumed). Choosing for instance a conus angle of 45°, as shown in Fig. 2, then for the drawn border rays $S_1$ and $S_2$ there results nearly a doubling of the path by multiple reflection as compared with a ray running along the axis of the chamber and being not reflected by the conical walls. Furthermore due to the conical shape of the receiving chambers the gas is heated more uniformly. The intensity of the radiation component which is absorbed by the gas, as known, decreases exponentially with increasing depth according to Beer's law. This causes a non-uniform heating of the gas in cylindrical chambers which may result in a disturbing gas flow. In case the receiving chamber is conical, however, there takes place a concentration of the radiation in the lower part of the conus along a focus line B (see Fig. 2) running along the axis of the conus. The amount of radiation absorbed per unit volume of the gas, otherwise decreasing with increasing depth, therefore partially is raised again by this concentration of radiation. Thus a strong heating takes place also in the bottom of the chamber. This heating of the gas preferably takes place along the conus axis, i. e. where the gas is less exposed to cooling by the chamber walls. It follows from this all an increase of sensitivity and lessening of the response time constant of the receiving chambers. The latter will further be lessened by the small gas flow resistance of the large area slots 5 and 6. Therefore corresponding to the net lessening of the response time constant the frequency of interruption of the radiation can be raised.

The membrane condenser is fitted into chamber 3 from below. It comprises a circular shaped membrane 8 being concentric to the chamber 3 and forming the one metallic electrode and a cylindrical anti-electrode 9 having the same axis of symmetry.

The membrane 8 is kept in stretched condition by means of two strech-rings 13, which are pressed together by three symmetric disposed flat sunk screws 14, the membrane itself being supported by the ring shaped edge 10 of the metallic ring 12 which rests on an insulating ceramic disc 11. This metallic ring 12 as well as the stretch-rings 13 are both concentric to the condenser chamber 3. Between the screws 14 there are provided three drill holes 15 in the strech-rings 13, each of the three having a thread. In the metallic ring 12 there are on the lower side in register with these drill holes 15 three further drill holes 16 capable to house each a screw spring 17 and there are finally in it in register with holes 15 and 16 three holes 18 capable each to let pass a screw 19 having a cylindrical head. Accordingly the ceramic disc 11 is provided with holes 20 in register with the drill holes 16 of the metallic ring 12.

The screws 19 are each led through a screw spring 17 and with the thread in front brought to the threaded drill holes 15 coming from the lower side of the ceramic disc 11 and passing the holes 18 of the metallic ring 12. Then they are screwed into the threaded drill holes 15 of the strech-rings 13 as far till the membrane 8 of the condenser is streched completely plane with the tension of the screw-springs 17 being equal.

The anti-electrode 9 shaped like a flat cylinder is provided with perpendicular drill holes 21. It forms the upper part of a cylindrical support 22 being fixed to the ceramic disc 11 and located amidst the metallic ring 12. This support is provided with drill holes 23, which pierce one another. The metallic ring 12 forming the support of the membrane 8 is provided with a drill-hole 24 serving as inlet for the conducting plug-in 26 and the support 22 for the anti-electrode 9 is provided with a drill hole 25 serving as inlet for the conducting plug pin 27. The cylindrical metallic ring 12 is surrounded on its outer surface by a tight fitting insulating ring 28.

If the ceramic disc 11 together with the parts carried by it is inserted from below into the cylindrical guide 71 of the condenser chamber 3, whereby bearing against a ring shaped shoulder 29 of the condenser chamber 3, then the compartment of the condenser chamber lying above the membrane 8 is communicated by means of the upper slot 5 with the left hand receiving chamber 2, whilst the compartment of the condenser chamber lying below the membrane 8 is communicated with the right hand receiving chamber by means of a recess 30 of the membrane support 12 and the insulating ring 28, which pursues the lower slot 6. The lower compartment of the condenser chamber thereby comprises the ring shaped space 31 between the membrane support 12 and the anti-electrode support 22 as well as the inner of the drill holes 21 and 23 provided in the anti-electrode 9 and its support 22 serving to balance the measuring pressure on the lower side of the membrane 8. The insulating ring 28 besides for insulating the membrane support 12 against the metal block 1 serves for preventing leakage of the condenser chamber compartments lying on both sides of membrane 8 and finally for a mechanical protection when inserting the condenser into its chamber 3. Between the outer diameter of the insulating ring 28 and the inner diameter of the condenser chamber 3, however, there is a clearance such, that between both the walls there is left a gap 32 allowing slow pressure fluctuations between both the receiving chambers to balance one another.

The ceramic disc 11 carries on its inner and outer face protecting rings 33 connected the one with the other by a piece of wire 34 led through a hole in the ceramic disc. These protecting rings 33 serve to lead away surface leakage currents occurring between both the electrodes to the mass of the metal block 1. The ceramic disc 11 rests by means of contact-pieces 7 which may be springy on a circular metal cover plate 37. Cover plate 37 contains the two plug pins 26, 27 leading to the inner and being imbedded vacuumtight into two insulating plastic pieces 35, 36. The ends of these plug pins 26, 27 directing towards the inner are slotted. The cover plate 37 has a cylindrical border 38 protruding towards the upper side into a ring shaped groove 40 of the metal block 1 with a tightening strip 39 interconnected. By a threaded clamping ring 41 which can be screwed from below into the metal block 1, the cover plate 37 is pressed vacuumtight against the metal block 1 thus tightening the inner of the condenser chamber 3 completely against the outer atmosphere. The plug pins 26, 27 effect the leading in of the current from the outer conductors towards the electrodes 8, 9 of the condenser. The protecting rings 33 are connected by means of the contact-pieces 7 with the cover plate 37 and hence with the metal block 1 too. The drill-holes 42 in the clamping ring 41 serve as usual for the insertion of a tool in order to facilitate the tightening of the clamping ring 41.

In this Figure 2 there is also shown a thermostat keeping metal block 1 at constant temperature. A recess 51 in metal block 1 houses a temperature probe 52 controlling two heating elements 54 which are placed in recesses 53 of the metal block 1. The purpose of the thermostat in this case is the following:

By keeping the metal block 1 at constant temperature the effect of nonsymmetric thermic influences upon the receiving chambers 2 can be lessened. Eventually one chooses a temperature higher than the one of the surrounding space, for by keeping the temperature of the metal-block by means of a thermostat at a temperature essentially higher than the one of the surroundings the influence of an increase in temperature caused by radiation and convection acting upon the metal block 1 accordingly will be less. Moreover there is the fact, that many gases possess a saturation-pressure being too small at normal temperature to warrant sufficient absorption of the interesting component of the radiation (e. g. watersteam). By an increased temperature of the receiving chambers the gas concentration and hence the sensitivity of the device can be increased substantially. The maintaining of an equal and constant temperature necessary to get a constant indication may be obtained without trouble.

Figure 3:
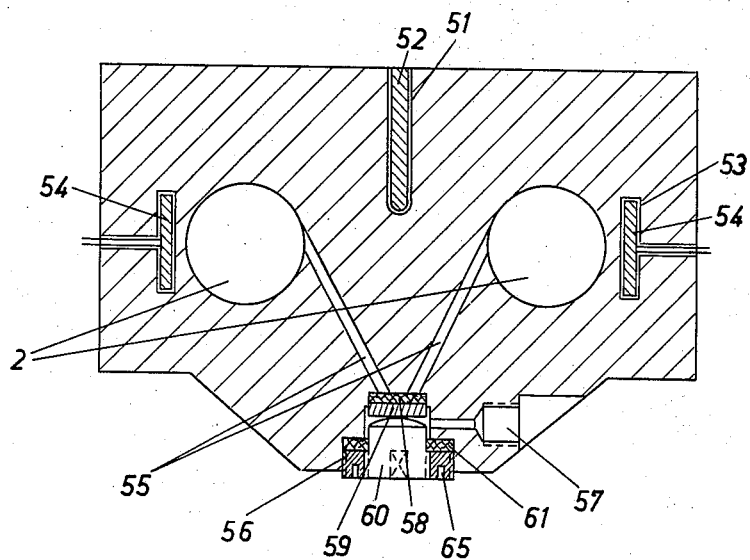

According to Fig. 3 showing a horizontal section of metal block 1 both the receiving chambers 2 are connected to a valve-chamber 56 provided at the one side of the metal block 1. This connection is effected by two feeding pipes 55 leading from the one resp. the other receiving chamber to said valve-chamber 56 which is common to both pipes 55 and provided with a filling connection 57 departing from it. The openings of the feeding pipes are tightened by a tightening piece 58 and a metal disc 59 against which a pressure screw 60 acts. The valve-chamber is tightened against the outer atmosphere by a gasket 61 and a further pressure screw 65 containing the pressure screw 60 which latter is screwably held in it. Both pressure screws therefore are adjustable independently. Hence the valve separates the feeding pipes 55 from one another as well as both from the atmosphere. This Fig. 3 also shows temperature probe 52 and heating elements 54.

Figure 4:
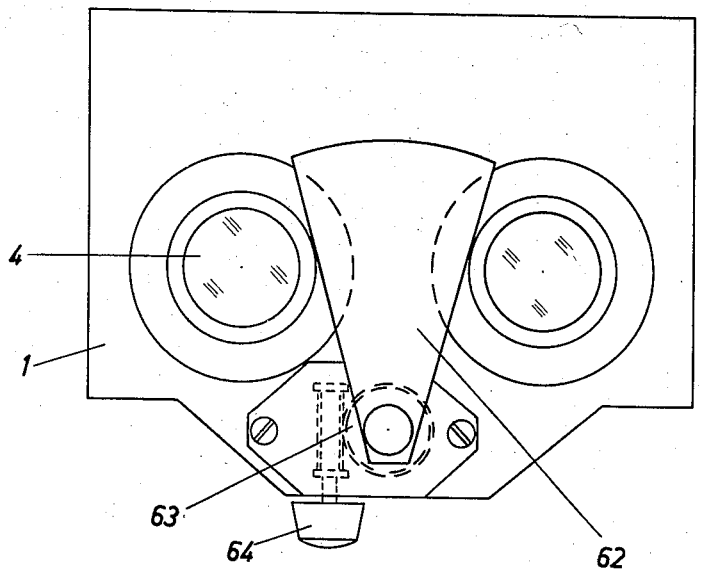

The top view given in Fig. 4 shows the positioning of a screen 62 carried by the metal block 1. This screen 62 is adjustable to vary the intensity of the radiation in the two beams and by moving it the intensity of the two beams may be balanced. Said screen 62 has the form of a rotary sector disc. It is supported by the metal block 1, symmetrical to the two window-plates 4 and rotatable above them. It may be handled by a worm gear 63 and an actuating button 64.

In assembling the device the membrane 8 is streched by means of the streching rings 13 and the screws 19 so that it rests completely plane on the edge 10 of the metallic ring 12. This done the ceramic disc 11 is inserted into the guide 71 of the condenser chamber 3 together with the electrode supports carried by it. Thereby the membrane condenser is protected by the insulating cylinder 28 surrounding the metallic ring 12. Then the cover-plate 37 is put on, whereby the insulated plug pins 26, 27 carried by it are introduced through the related holes of the ceramic disc 11 into the corresponding drill holes 24, 25 of the conductive supports 12 and 22 for the electrodes 8 and 9. Cover-plate 37 is tightening pressed against the metal block 1 by means of the clamping ring 41; said cover-plate fixing the condenser in its position which thus becomes always easily accessible. By inserting the condenser the diffusion gap 32 between the two large area slots 5 and 6 is formed. Membrane 8 now extends perpendicular to the axes of the receiving chambers 2 and hence is unsensitive to shocks occurring in horizontal direction but sensitive to variations of the measuring pressure acting upon the membrane 8 in vertical direction.

As soon as the holders 43 for the window-plates 4 are put on the apertures of the two receiving chambers and screwed to the metal block 1 the receiving chambers 2 may be evacuated and then filled. For this purpose a vacuum pump is connected to the filling connection 57 and the pressure screw 60 screwed back. Now the valve 56, 59 is open and the pump is communicated with the feeding pipes 55 leading to the receiving chambers. Both the chambers thus may be evacuated at the same time. By heating, for instance by means of the built in thermostat, foreign gases absorbed at the walls of the chambers may be driven out for the most part. At the same time the vacuum-tightness of the receiving chambers may be examined by simple means. Thereafter the provided filling gas may flow into this vacuum through the filling connection 57 without coming into contact with the atmosphere. If the filling has ceased the pipes 55 are shut again by screwing in the pressure-screw 60.

If now the radiation periodically acts upon both the receiving chambers 2 it causes a quick pulsation of the measurement values (gas pressure) which through the slots 5 and 6 on both sides of the membrane 8 of the condenser now act upon this. The diffusion gap 32 being the result of the clearance between the neighboured walls of the condenser chamber 3 and the insulating ring 28 tightens sufficiently both compartments of the condenser chamber against these quickly elapsing pressure differences. Very slowly elapsing pressure differences, however, as caused by slow temperature fluctuations, e. g. of the surrounding space and occurring between both the receiving chambers are allowed to balance.

Springs 17 in Fig. 2 serve for keeping consant the tension of the membrane. Therefore, if in the course of time by inelastic deformation the membrane 8 should extend it is continuously streched again by these springs 17. For if as shown in Fig. 2 the membrane 8 clamped between the streching rings 13 rests upon the border 10 of the mteallic ring 12 warranting the correct distance of both the electrodes 8 and 9, then the constant tension of the membrane is achieved by the fact, that the screws 19 by means of the strained screw springs 17 act upon the streching rings 13.

In the shown device both the electrodes 8 and 9 of the membrane condenser are insulated against metal block 1 and this latter is laid to ground- or protecting-potential. For insulation serves among others the above mentioned protecting ring 28 for the ring shaped membrane support 12. Furthermore there is made use of the protecting-ring principle at the insulator 11 carrying both the electrodes, i. e. the path of leakage current in insulator 11 between the electrodes 8 and 9 is separated by a further protecting electrode 33 connected to the housing. Leakage currents from membrane 8 having high potential thus cannot arrive at the anti-electrode 9 but are led down to mass across the protecting electrode 33. The insulation of the electrodes therefore may be relatively bad without causing errors in the measurement. This is especially important when using a filling gas which favours a deterioration of the insulation as is the case with water steam, aggressive gases and carbon-dioxide. The protecting ring 33 may also completely separate the insulator 11, so that the currents flowing in its inner are led down too.

By fixing the screen 62 serving for balancing the radiation intensity of the two beams directly to the metal block 1 housing the receiving chambers 2 and the measuring condenser an unambiguous spatial correlation of this screen to the receiving chambers and the measuring condenser is achieved.

We claim:

1. In a gas analyser wherein gases are compared by passage of light in parallel beams separately through the respective gases and the amount of light absorbed by the respective gases compared, a detector, said detector comprising a metal block having upper and lower faces and provided with a pair of axially parallel gas chamber recesses of circular cross section opening toward the upper face; and a cylindrical third recess between the chamber recesses and axially parallel therewith and opening at the lower face, a pair of ducts being provided in the block connecting the chamber recesses with the third recess at different depths therein, a ceramic disk disposed in the third recess transverse the axis thereof and below the ducts; a conductive annulus in third recess resting on the disk and heaving an outer flange; a conductive circular membrane electrode over the annulus; spring means passing through the flange and secured to the peripheral portions of the membrane electrode; and an anti-electrode mounted fast on the disk and having a perforated disk portion near and under the eelctrode.

2. In a gas analyser wherein gases are compared by passage of light in parallel beams separately through the respective gases and the amount of light absorbed by the respective gases compared, a detector, said detector comprising a metal block having upper and lower faces and provided with a pair of axially parallel like conical gas chamber recesses opening toward the upper face; and a cylindrical third recess between the chamber recesses and axially parallel therewith and opening at the lower face, a pair of ducts being provided in the block connecting the chamber recesses with the third recess at different depths therein, a ceramic disk disposed in the third recess transverse the axis thereof and below the ducts; a conductive annulus in third recess resting on the disk and having an outer flange; a conductive circular membrane electrode over the annulus; spring means passing through the flange and secured to the peripheral portions of the membrane electrode; an anti-electrode mounted fast on the disk and having a perforated disk portion near and under the electrode; a cylindrical ring of insulating material around the annulus and between the disk and the end-wall of the recess substantially gas-tight, the ring being slightly spaced from the curved wall of the third recess, said ducts entering the third recess on opposite sides of the membrane.

3. A device for analysing mixtures by means of infrared radiation comprising two sources of infra-red radiation and means for producing two respective beams therefrom; two containers for gas having infra-red transparent portions for passage of the respective beams through the containers; means for periodically interrupting the beams; a metallic block having a pair of opposite faces and provided with a pair of chamber recesses of circular cross section in one face, and axially parallel, the recesses being in optical alinement with the respective beams; infra-red transparent window plates covering the recesses to form gas-receiving chambers; the block being provided with a cylindrical recess in the opposite face to form a condenser chamber and axially parallel with the pair of chamber recesses; a membrane condenser in the condenser chamber; and means for establishing communication between the condenser chamber and the respective gas-receiving chambers, the axes of said receiving chambers being perpendicular to the plane of the membrane of said membrane condenser.

4. In a gas analyser wherein gases are compared by passage of light in parallel beams separately through the respective gases and the amount of light absorbed by the respective gases compared, a detector, said detector comprising a metal block having upper and lower faces and provided with a pair of axially parallel like gas chamber recesses opening toward the upper face; and a third recess between the chamber recesses and opening at the lower face, a pair of ducts being provided in the block connecting the chamber recesses with the third recess at different depths therein, a membrane condenser in the third recess and having a membrane electrode transverse the third recess and between the points of entry of the ducts into the third chamber, the membrane electrode dividing the third recess into two separate zones in communication with the respective chamber recesses, the axes of the chamber recesses being perpendicular to the plane of the membrane electrode, and means for closing the recesses gas-tight from the exterior.

5. A gas analyser comprising two sources of infra-red radiation and means for producing two respective beams therefrom; two containers for gas having infra-red transparent portions for passage of the respective beams through the containers; means for periodically interrupting the beams; a metallic block having a pair of opposite faces and provided with a pair of conical chamber recesses in one face, the recesses being in optical alinement with the respective beams; infra-red transparent window plates covering the recesses; the block being provided with a cylindrical recess in the opposite face and axially parallel with the pair of chamber recesses, the block being provided with a pair of ducts opening into the cylindrical recess at a different depth and into the respective chamber recesses, and a membrane electrode across the cylindrical recess between the openings of the ducts therein for movement in response to a pressure differential in pressure within the conical chamber recesses, the axes of all the recesses being perpendicular to the plane of the membrane electrode.

6. A gas analyser of the infra-red absorption type and comprising structure forming a pair of axially parallel conical like chambers opening in the same direction and having bright interior surfaces, and a third chamber; a condenser electrode membrane gas tight across the third chamber dividing same into two zones and in a plane to which the axes of the conical chambers is perpendicular, means providing gas tight communication between the zones and the respective conical chambers, and a rotary shutter having the axis of rotation parallel with the axes of the conical chambers.

References Cited in the file of this patent

UNITED STATES PATENTS

| | | |
|---|---|---|
| 2,583,221 | Martin | Jan. 22, 1952 |
| 2,673,298 | Hutchins | Mar. 23, 1954 |
| 2,674,696 | Smith et al. | Apr. 6, 1954 |
| 2,681,415 | Liston | June 15, 1954 |
| 2,688,090 | Woodhull et al. | Aug. 31, 1954 |
| 2,698,390 | Liston | Dec. 28, 1954 |

FOREIGN PATENTS

| | | |
|---|---|---|
| 634,453 | Great Britain | Mar. 22, 1950 |